F. B. MEYERS.
EMERGENCY COUPLING.
APPLICATION FILED JAN. 12, 1910.
968,382.
Patented Aug. 23, 1910.
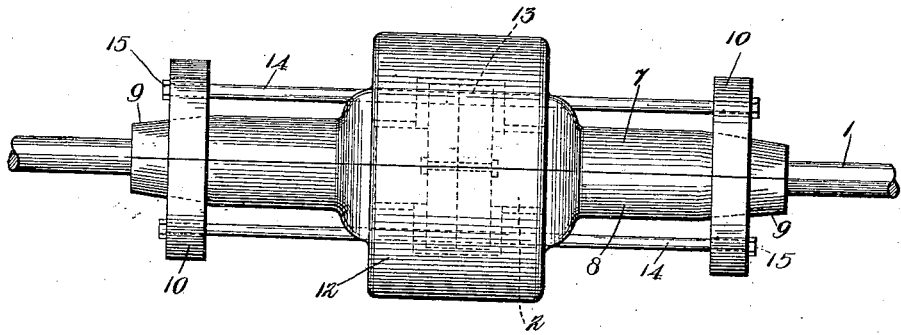
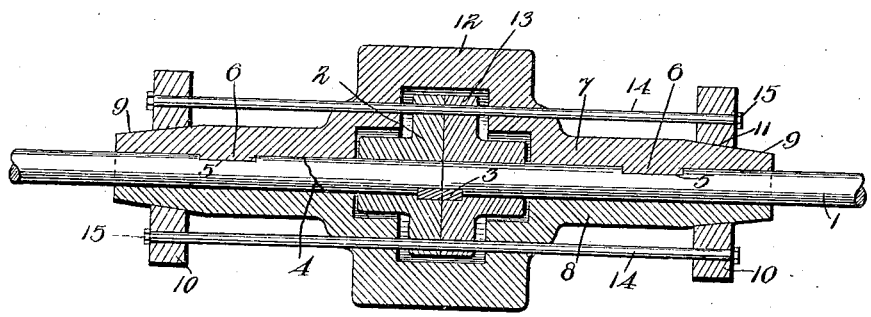
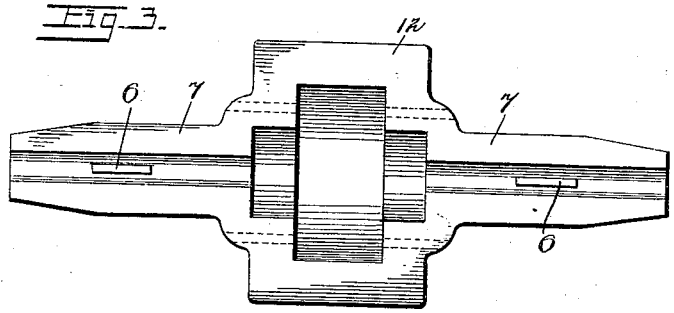
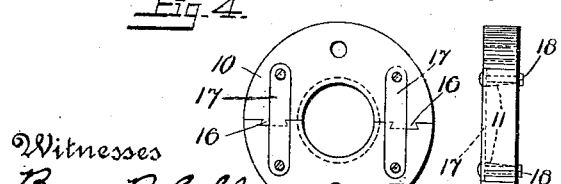
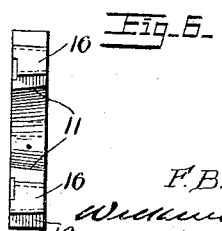
Witnesses
Byron B. Collings
W. M. Duvall
Inventor
F. B. Meyers, by
Dickinson Fisher
& Dickinson
Attorneys

UNITED STATES PATENT OFFICE.

FREDERICK B. MEYERS, OF COLGATE STATION, MARYLAND, ASSIGNOR OF ONE-FOURTH TO MARTIN NILSSON, OF BALTIMORE, MARYLAND, AND ONE-FOURTH TO WILLIAM PFISTER AND ONE-FOURTH TO CONRAD SCHMIDT, BOTH OF BALTIMORE COUNTY, MARYLAND.

EMERGENCY-COUPLING.

968,382.      Specification of Letters Patent.      Patented Aug. 23, 1910.

Application filed January 12, 1910. Serial No. 537,774.

*To all whom it may concern:*

Be it known that I, FREDERICK B. MEYERS, a citizen of the United States, residing at Colgate Station, Baltimore county, in the State of Maryland, have invented certain new and useful Improvements in Emergency-Couplings; and I do hereby declare the following to be a full, clear, and exact description of the invention, such as will enable others skilled in the art to which it appertains to make and use the same.

This invention relates to emergency couplings for joining together the ends of broken shafts at sea, and has for its object to produce a means by which such shafts may be securely and firmly joined without experiencing the vexatious delays which are incident to such accidents at the present time.

With these objects in view the invention consists in the novel details of construction and combinations of parts more fully hereinafter disclosed and particularly pointed out in the claims.

Referring to the accompanying drawings forming a part of this specification in which like numerals refer to like parts in all the views:—Figure 1 is an elevational view of a propeller shaft with my invention applied thereto; Fig. 2, is an elevational sectional view of the same, showing the lugs or keys integral with the coupling which engage the shaft; Fig. 3, is a detached portion of the coupling; and, Figs. 4, 5, and 6, are detail views of one of the rings employed in binding the parts together.

1 represents a shaft, 2 the usual couplings employed on such shafts and 3 the keys or other means by which the couplings 2 are secured thereto.

As is well known when a propeller shaft breaks at sea the fracture generally occurs at some place as at the point 4, which is near to the coupling 2, and in such event I chip away recesses 5 in the shaft on each side of the fracture 4 and so locate and shape the same as to accurately fit the lugs 6 which are integrally formed on or otherwise attached to the coupling member 7, as best shown in Figs. 2 and 3. There are preferably provided two coupling members 7 and 8 tapered as at 9 on each end and these members are hollowed out so as to accurately fit around the shaft 1 and the shaft coupling 2, as illustrated.

Rings 10 provided with tapered holes 11 are wedged over the tapered portions 9 at each end of the pair of coupling members 7 and 8 so as to firmly hold the same together. Through these rings, through the enlarged portions 12 of the coupling members 7 and 8, and through the enlarged portions 13 of the shaft couplings 2, pass the tie bolts or rods 14.

After the parts are in place as indicated in Fig. 2, the rings 10 are driven up as tightly as possible upon the tapered ends 9 of the emergency coupling and the rods 14 are tightened up by nuts 15 or by other means, so that all of said parts are firmly bound together.

In order to readily place the rings in position they are preferably made in two parts, as shown in Fig. 4, which are joined together by a tongue and groove or dovetailed connection 16. Straps 17 also preferably firmly secure the halves of the ring together by means of the bolts 18, as shown.

When the shaft does not break near the coupling 2, as indicated in Fig. 2, my emergency coupling may be placed on the same at any other point, and if desired an additional dummy coupling in all respects similar to the coupling 2, may be placed over the fracture, or said dummy coupling may be omitted, as desired.

It will be observed, that by making the lugs 6 integral with the parts 7 and by sinking them into the shaft as shown, an exceedingly strong and rigid connection is made between said part 7 and the two broken ends of the shaft. It will also be observed that by passing the rods 14 through the shaft coupling 2 that this strong connection is further increased in rigidity.

What I claim is:—

1. In an emergency coupling the combination of a shaft provided with a coupling having holes therethrough; an emergency coupling having an enlargement fitting over said first mentioned coupling and provided with tapered ends; rings having tapered bores fitting said ends; and rods binding the parts together passing through said rings and said holes; substantially as described.

2. In an emergency coupling the combination of a shaft having recesses 5 therein and provided with a coupling having holes therethrough; an emergency coupling consisting of two parts fitted together and having tapered ends; lugs 6 adapted to fit said recesses and rigid with one of the parts of said emergency coupling; rings provided with holes and with tapered bores fitting said tapered ends; and rods passing through the holes in said coupling and in said rings, substantially as described.

3. In an emergency coupling the combination of a shaft having recesses 5 therein and provided with a coupling having holes therethrough; an emergency coupling consisting of two parts fitted together and having tapered ends; lugs 6 adapted to fit said recesses and rigid with one of the parts of said emergency coupling; rings made in two parts having dove tailed connections, and straps 17 joining said parts, said rings provided with holes and with tapered bores fitting said tapered ends; and rods passing through the holes in said shaft coupling and in said rings, substantially as described.

In testimony whereof, I affix my signature, in presence of two witnesses.

FREDERICK B. MEYERS.

Witnesses:
JOHN A. HENKUS,
REGINALD S. OPIE.